United States Patent Office 2,695,319
Patented Nov. 23, 1954

2,695,319

PROCESS OF PRODUCING VERATRYL COMPOUNDS

Ferdinand Dengel, Mannheim, Germany, assignor to Knoll A.-G. Chemische Fabriken, Ludwigshafen (Rhine), Germany, a corporation of Germany No Drawing. Application January 17, 1951, Serial No. 206,521

Claims priority, application Germany February 2, 1950

5 Claims. (Cl. 260—613)

This invention relates to a process of producing veratrylchloride and more particularly to a process of producing veratrylchloride from veratrole by chloromethylation.

It is known that on reacting formaldehyde and hydrogen chloride with compounds of the aromatic series, chloromethyl compounds are formed by substitution of a nuclear hydrogen atom. But this reaction does not yield satisfactory results when applied to veratrole because higher condensed ring systems, as, for instance, dihydro anthracene derivatives, are produced thereby. Although a number of modifications of said chloromethylation process have been suggested, hitherto no process of making veratrylchloride has become known which yields more than 50% of the theoretical amount. Attempts to use monochloromethylether in glacial acetic acid instead of formaldehyde for chloromethylating veratrole did not substantially improve said process because most of the veratrole employed did not react and, therefore, was recovered in unchanged condition.

One object of this invention is to provide an improved method of chloromethylating veratrole. In this new modification formaldehyde and gaseous hydrogen chloride are continuously supplied to a solution of veratrole in an organic solvent, said solution having been saturated with gaseous hydrogen chloride prior to the reaction.

Other objects of this invention will become apparent from the specification and the examples given hereinafter.

The formaldehyde may be supplied to the reaction mixture by adding a 40% aqueous formaldehyde solution drop by drop within about one hour to said mixture. Care must be taken that the temperature of the reaction mixture does not exceed about 20° C. Undue increase in temperature is prevented by cooling. One may, however, add polymer paraformaldehyde in one portion to the solution of veratrole whereafter hydrogen chloride gas is passed through said mixture. Thereby the paraformaldehyde is gradually monomerized by the action of hydrogen chloride; that means that formaldehyde is continuously formed in the solution and is reacted in statu nascendi with veratrole. The reaction is preferably carried out with hydrogen chloride under increased pressure.

It is advisable not to isolate veratrylchloride as such, due to the tendency of said compound to enter side-reactions, but to react it immediately, for instance, with an alkali cyanide, such as potassium cyanide, thereby producing the corresponding nitrile. Said reaction proceeds readily with a yield of 90% of the theoretical amount.

The yield of veratrylchloride according to the new process of this invention amounts to more than 70%. Said yield is increased to about 85% based on reacted veratrole; for, the unreacted veratrole can be recovered.

The following examples serve to illustrate the invention without, however, limiting the same to them.

*Example 1*

250 g. of veratrole are dissolved in 1000 cc. of benzene. Said solution is saturated at about 10° C. with dry hydrogen chloride gas, while stirring and cooling with ice. Thereafter 68 g. of paraformaldehyde are added and a rapid stream of dry hydrogen chloride gas is continuously passed into the mixture while stirring vigorously and maintaining the temperature of the reaction mixture below 20° C. After one hour the solution is decanted from the sediment and the solvent is removed by evaporation under reduced pressure. The resulting crude veratrylchloride is reacted preferably immediately after its formation, with potassium cyanide to form veratrylcyanide. On fractional distillation of said cyanide under reduced pressure a fore-run of 41 g. of veratrole is collected. The main fraction (boiling at 145–155° C./1 mm.) consists of 203 g. of veratryl cyanide. Yield: 63.4% of the theoretical amount corresponding to a yield of veratrylchloride of 70.5%. Based on veratrole consumed, the yield of veratrylchloride amounts to 84% of the theoretical amount.

*Example 2*

250 g. of veratrole are dissolved in 100 cc. of benzene. The solution is saturated with hydrogen chloride gas at about 10° C. 170 g. of a 40% aqueous formaldehyde solution are added drop by drop within 45 minutes to said solution while stirring vigorously and passing a rapid stream of hydrogen chloride gas through the reaction mixture. Care must be taken that the temperature does not exceed 20° C. After addition of the formaldehyde, the reaction mixture is stirred and hydrogen chloride gas is passed therethrough for further 20 minutes. Thereafter it is worked up as described in Example 1. The yield of veratrylchloride amounts to 65% of the theoretical amount.

*Example 3*

250 g. of veratrole are dissolved in 1000 cc. of technical grade toluene. The solution is saturated with hydrogen chloride gas at about 10° C. 68 g. of paraformaldehyde are added to said solution while stirring vigorously and passing a rapid stream of hydrogen chloride gas through the reaction mixture at a temperature not exceeding 22° C. Soon, the temperature starts to rise and is adjusted, by cooling from the outside, in such a manner that it is constantly kept between 20° C. and 23° C. After 60 minutes the toluene solution is separated from water and sludge formed during reaction. Toluene is removed from said solution by distillation at a vacuum of 12 mm. and a bath temperature of 40–50°. There remains a light-yellow oil which is advantageously converted forthwith into the nitrile by reaction with potassium cyanide. From the crude nitrile there is obtained by vacuum distillation at 10 mm. a fraction boiling from 70° to 130° C. and containing 41 g. of unchanged veratrole, and at 2 mm. a fraction boiling from 150° to 180° C. containing 198 g. of pure veratrylcyanide. The distillation-residue of 38 g. consists essentially of 2,3,6,7-tetramethoxy-9,10-dihydro-anthracene.

The yield of veratrylcyanide, taking into consideration the veratrole recovered, amounts to 82% of the theory.

*Example 4*

100 g. of veratrole are dissolved in 400 cc. of ligroin (B. Pt. 120–130° C.) and the resulting solution is saturated at 5° C. with gaseous hydrogen chloride. After adding 68 g. of paraformaldehyde a vigorous stream of hydrogen chloride is passed through said solution for 60 minutes with stirring thereby keeping the temperature between 20° and 23° C. The ligroin solution is separated from the aqueous sludge at the bottom, washed 3 times with ice-water and finally dried over anhydrous calcium chloride for 30 minutes. The solvent is removed in vacuo and the unchanged veratrole (16 g.) is distilled off at 10 mm. The residue is then preferably distilled quickly at 0.1 mm. Hg, in a double-bulbed tube or a high vacuum short-path molecular still, whereby at an air temperature of about 100° C. veratrylchloride passes over as a colorless oil which soon crystallizes. There are obtained 91 g. of pure veratrylchloride of a M. Pt. of 48°–49° C. (corr.) i. e. 80% of the theory, deducting in the calculation the amount of veratrole recovered in unchanged form.

*Example 5*

A mixture of 250 g. of veratrole and one liter of glacial acetic acid is saturated with hydrogen chloride gas while cooling with ice at a temperature of 5–10° C. 68 g. of paraformaldehyde are added and, with vigorous stirring a lively current of hydrogen chloride is passed through the solution for 60 minutes at 20–23° C. The reaction solution is poured unto finely crushed ice and is extracted several times with chloroform. The combined chloroform extracts are dried for 30 minutes with anhydrous sodium sulfate, the chloroform is distilled off in vacuo and the oily residue is subsequently treated with potassium cyanide in the usual way. The crude nitrile obtained on working up the reaction mixture, is distilled in vacuo. There is obtained a first fraction distilling at 80–130° C. (10 mm.) containing 40 g. unchanged veratrole and then, at 150–180° C. (2 mm.), a main fraction representing 200 g. of pure veratrylcyanide. The distillation residue consists of 2,3,6,7-tetramethoxy-9,10-dihydroanthracene. The yield in veratrylcyanide is 73% of the theoretical yield when taking into consideration the amount of the recovered veratrole. The yield in veratrylchloride can be figured at 82.5% of the theory.

Instead of the solvents mentioned in the examples there may be employed other indifferent solvents such as chlorobenzene, bromobenzene, nitrobenzene, cyclohexane, gasoline and mixtures thereof. While the reaction temperature must not exceed about 23° C., it is of advantage to carry out the reaction between 10 and 20° C., and especially between 20 and 23° C. The amount of formaldehyde or paraformaldehyde reacted with veratrole corresponds to substantially the theoretical amount or is only slightly in excess of the same, i. e. an excess of about 10–15% of formaldehyde is used. The speed of addition of the formaldehyde and the hydrogen chloride gas depends upon the effectiveness of the stirring device and the cooling means. The temperature on distilling off the solvent from the reaction mixture should also be kept as low as possible in order to prevent side-reactions of the veratryl chloride. Therefore, it is of advantage to employ low boiling solvents for dissolving the starting material. The present invention is of great importance in the art of producing alkaloids for instance papaverine and synthetic antispasmodic drugs of similar chemical structure of the type of substituted benzylisoquinolines and their hydrogenation products as well as of the type of alkyl-bis-(phenyl-ethyl)-amines, because it provides the necessary starting materials, veratryl chloride and veratryl cyanide in a yield hitherto not attainable, thereby rendering the process of making papaverine and similar antispasmodic drugs much more economical.

Of course, many changes and variations in the reaction conditions, the solvents used and the like may be made by those skilled in the art in accordance with the principles set forth herein and in the claims annexed hereto.

What I claim is:

1. In a process of producing veratrylchloride by chloromethylation of veratrole, the steps comprising saturating a solution of veratrole in an inert organic solvent with hydrogen chloride and continuously supplying formaldehyde and gaseous hydrogen chloride to said veratrole solution, the temperature during said chloromethylation not exceeding about 23° C., the inert organic solvent being not affected by and not reacting with the reaction components under the reaction conditions.

2. In a process of producing veratrylchloride by chloromethylation of veratrole, the steps comprising saturating a solution of veratrole in an inert organic solvent with hydrogen chloride, adding paraformaldehyde to said veratrole solution, and passing gaseous hydrogen chloride through the resulting reaction mixture, thereby maintaining the reaction temperature at a temperature below about 23° C., the inert organic solvent being not affected by and not reacting with the reaction components under the reaction conditions.

3. In a process of producing veratrylchloride by chloromethylation of veratrole, the steps comprising saturating a solution of veratrole in an inert organic solvent with hydrogen chloride, continuously supplying a substance capable of yielding formaldehyde under the reaction conditions, and gaseous hydrogen chloride to said veratrole solution, the temperature during said chloromethylation not exceeding about 23° C., the inert organic solvent being not affected by and not reacting with the reaction components under the reaction conditions.

4. In a process of producing veratrylchloride by chloromethylation of veratrole, the steps comprising saturating a solution of veratrole in a solvent selected from the group of low boiling aliphatic and aromatic hydrocarbons with hydrogen chloride, and continuously supplying formaldehyde and gaseous hydrogen chloride to said veratrole solution, the temperature during said chloromethylation not exceeding about 23° C.

5. In a process of producing veratrylchloride according to claim 4, wherein the solvent is benzene.

References Cited in the file of this patent

UNITED STATES PATENTS

| Number | Name | Date |
|---|---|---|
| 1,887,396 | Brunner | Nov. 8, 1932 |
| 2,304,537 | Cambron | Dec. 8, 1942 |

FOREIGN PATENTS

| Number | Country | Date |
|---|---|---|
| 347,892 | Great Britain | May 7, 1931 |

OTHER REFERENCES

Pschorr et al., Ber. Deut. Chem., vol. 33, p. 166 (1900).

Pschorr, Liebig's Ann., vol. 391, p. 36 (1912).

Kaufmann et al., Ber. Deut. Chem., vol. 51, p. 127 (1918).

Gawson, Jour. Am. Chem. Soc., vol. 41, p. 744 (1949).

Piutti et al., Beilstein (Handbuch, 4th Ed.) vol. 10, p. 269 (1949).